United States Patent [19]

Head

[11] Patent Number: 5,354,087

[45] Date of Patent: Oct. 11, 1994

[54] ADJUSTABLE TRAILER HITCH

[75] Inventor: Harold W. Head, Cameron, Tex.

[73] Assignee: Gooseneck Trailer Mfg. Co., Inc., Bryan, Tex.

[21] Appl. No.: 62,847

[22] Filed: Apr. 14, 1993

[51] Int. Cl.⁵ .............................................. B60D 1/46
[52] U.S. Cl. .................................. 280/490.1; 280/494
[58] Field of Search ..................... 280/490.1, 488, 494, 280/462, 478.1, 511

[56] References Cited

U.S. PATENT DOCUMENTS

| | | | |
|---|---|---|---|
| 2,347,081 | 4/1944 | Caton | 280/490.1 |
| 2,444,086 | 6/1948 | Baker, Jr. | 280/494 |
| 2,497,234 | 2/1950 | Mylie | 280/494 |
| 3,922,006 | 11/1975 | Borges | 280/490.1 X |
| 4,037,856 | 7/1977 | Medlin et al. | 280/488 X |
| 4,111,449 | 9/1978 | Hancock | 280/490.1 X |
| 4,768,803 | 9/1988 | Hewitt et al. | 280/494 X |

FOREIGN PATENT DOCUMENTS 9205040  4/1992  PCT Int'l Appl. .................. 280/494

OTHER PUBLICATIONS

Author (unknown); Title: Redneck Trailer Supplies; p. 80; Date: 1993; Place of Publication: U.S.A.
Author (unknown); Title: H&S Trailer Parts, Inc.; pp. 115-116; Date: Feb. 1990; Place of Publication: U.S.A.

*Primary Examiner*—Eric D. Culbreth
*Assistant Examiner*—Carla Mattix
*Attorney, Agent, or Firm*—Mark A. Oathout

[57] ABSTRACT

An adjustable trailer hitch for hitching a trailer to a vehicle. The trailer hitch includes a first plate attached to the trailer and a second plate attached to a ball coupler. The first plate includes a slot, and the second plate includes two holes through which bolts may be inserted whereby unlimited adjustment between the plates can be achieved within a predefined range. The trailer hitch also includes a tongue having a coupler plate attached to one side. A pivot plate is pinned to the coupler plate and a latch pin is inserted through the tongue, coupler plate and pivot plate for latching the pivot plate. The latch pin and pivot plate are free to move when the trailer is being hitched to the vehicle.

11 Claims, 5 Drawing Sheets

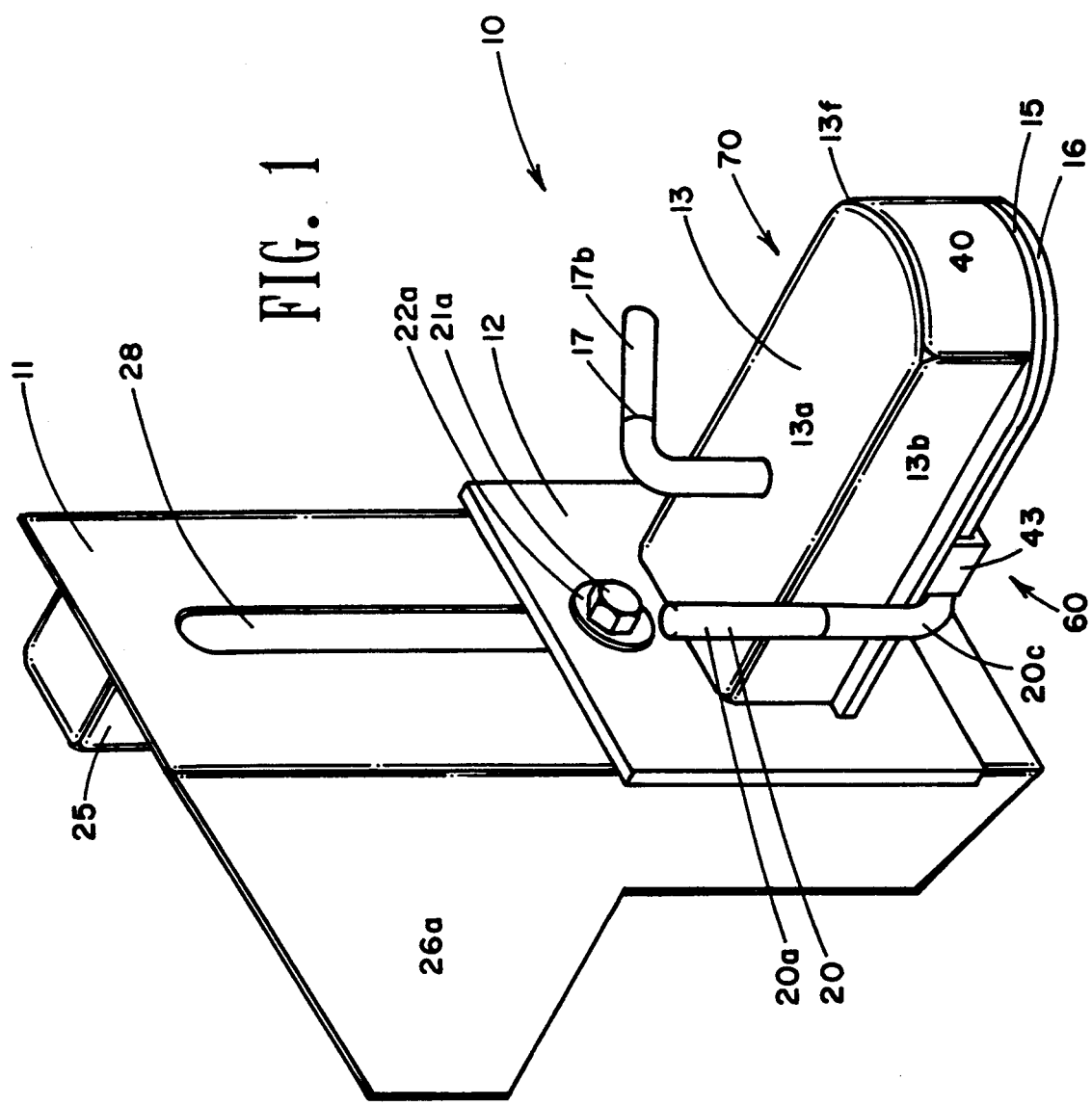

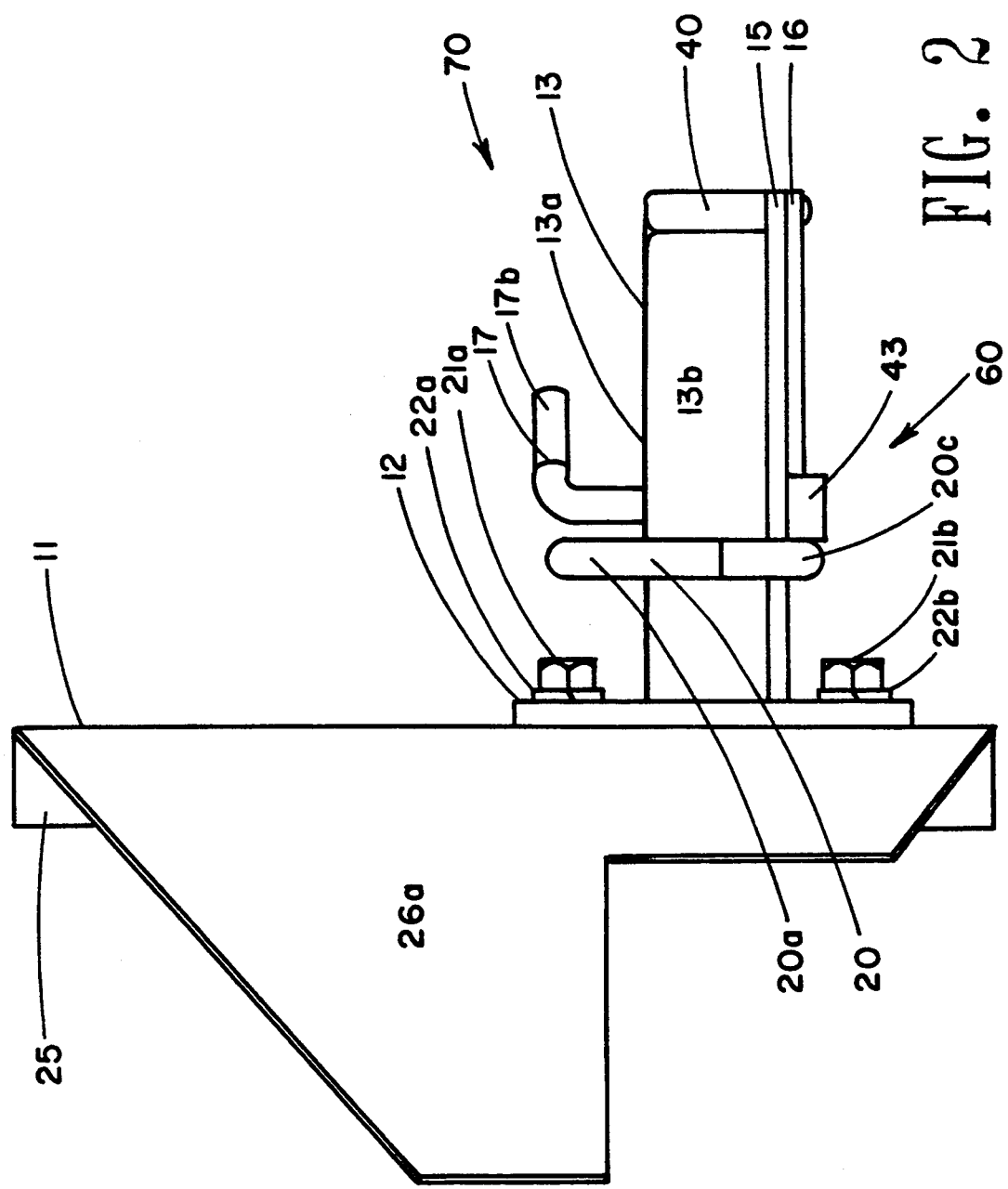

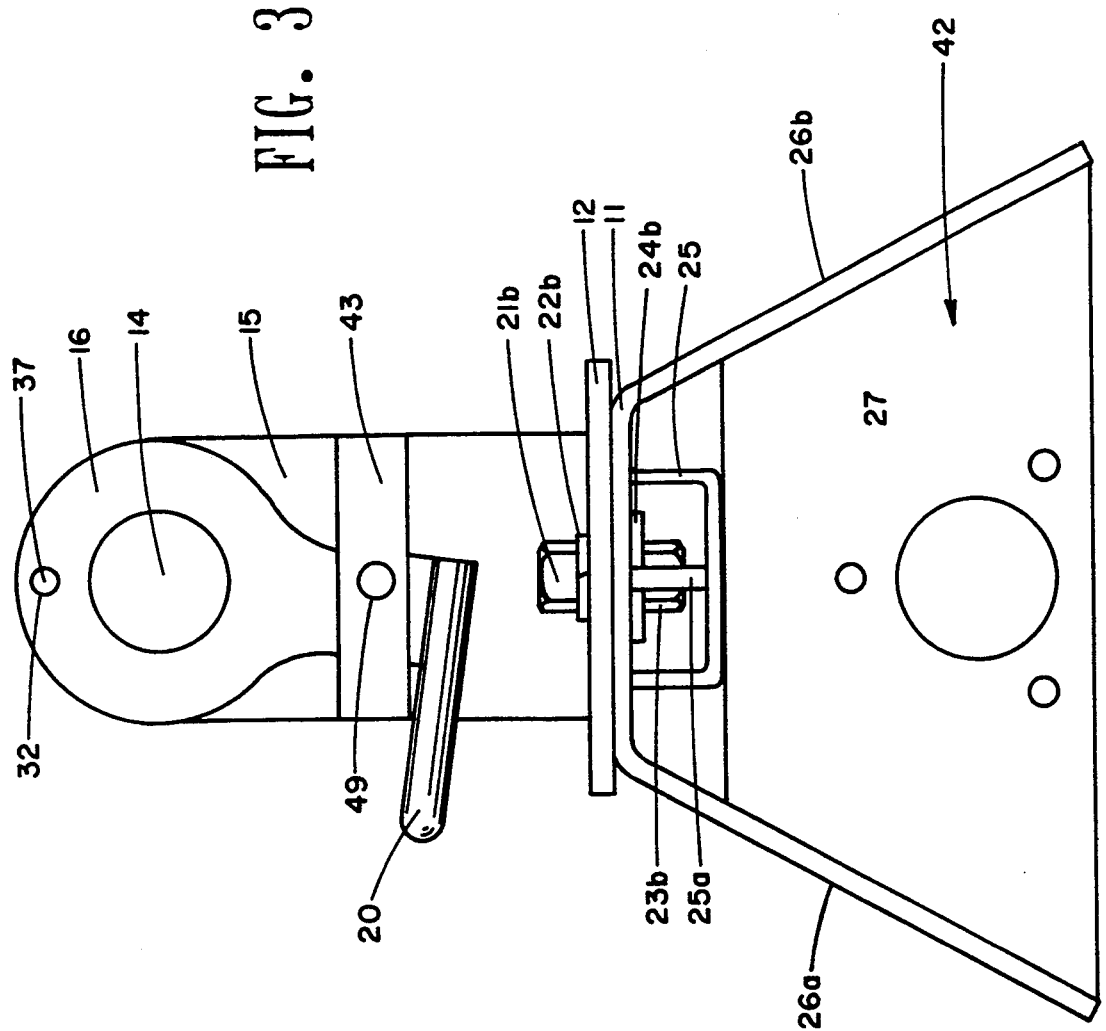

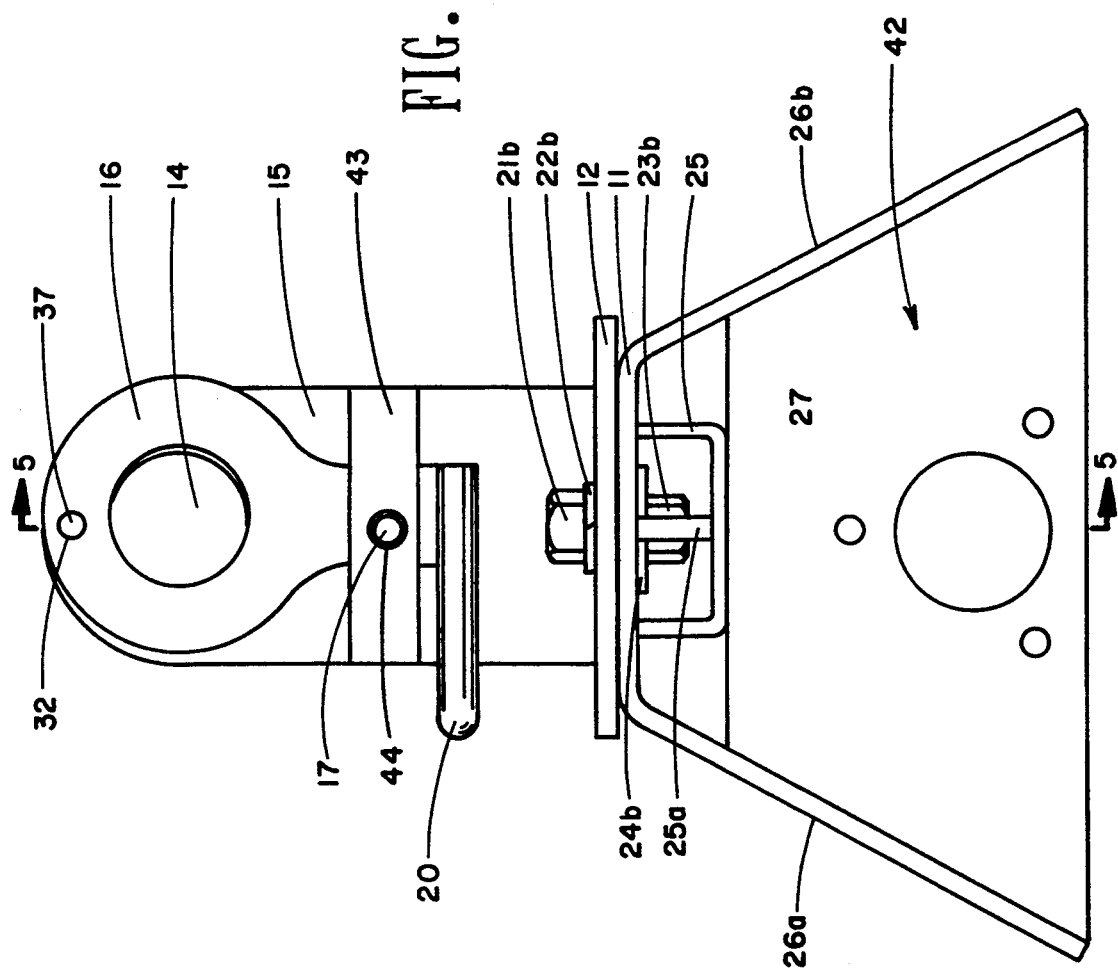

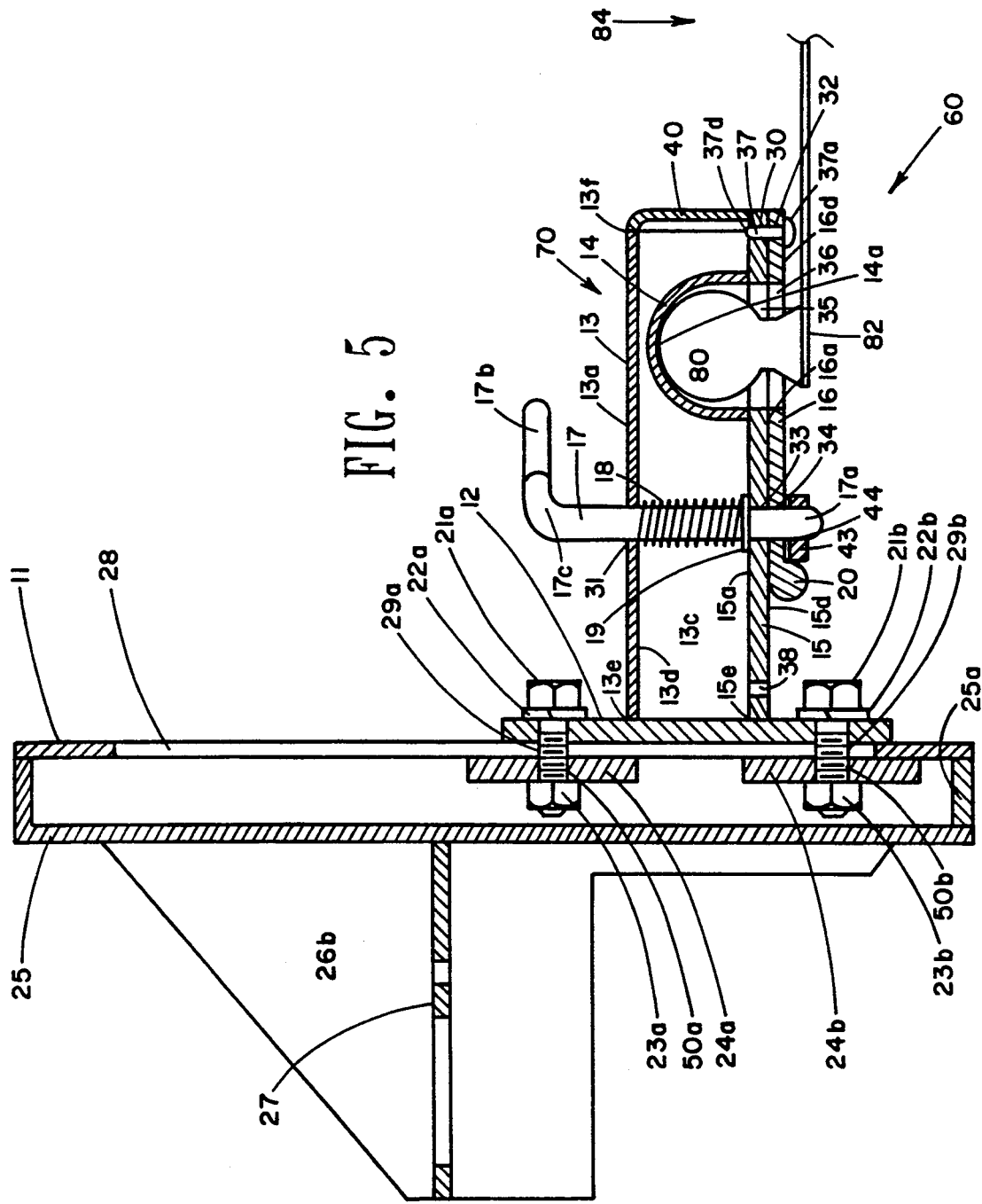

ADJUSTABLE TRAILER HITCH

BACKGROUND OF THE INVENTION

Tongue or bumper-pull type trailer hitches allowing for adjustment to compensate for height of the towing vehicle have been in use for several years. All employ the use of a series of holes in two hitch parts, using pins or bolts and nuts inserted through both hitch parts to secure the hitch in its adjusted height position. These hitches allow for adjustment in finite, bounded or limited increments varying from 2 to $4\frac{1}{2}$ inches. Bounded incremental adjustments are not adequate for proper leveling of trailers using multiple axles with rubber torsion suspensions as will be discussed in greater detail below.

Rubber torsion suspensions have greatly increased in popularity and have replaced the standard spring and hanger suspensions in many trailer axle applications. With multiple axle configurations when rubber torsion suspensions are used in combination, it becomes even more important to tow the trailer under level conditions (i.e. parallel to the ground). One major manufacturer proclaims that when towing a trailer with three (3) rubber torsion suspension type axles a level towing condition is critical to prevent the development of resonant vibration caused by unequal loading on the axles. Resonant vibration leads to suspension damage or may cause suspensions to break away from the trailer mountings.

As mentioned above, finite incremental adjustments allowed on previously available adjustable tongue hitches are inadequate for proper leveling of trailers equipped with rubber torsion suspensions. On shorter trailers, such as those designed to carry one or two horses or smaller utility and cargo trailers, a 2 inch difference in the height of the trailer hitch can cause several hundred pounds difference in the load carried by each of two or more axles. This difference in axle loading may be sufficient to cause the development of resonant vibration sufficient to damage or destroy the axle mountings. Trailers towed in other than a level condition (i.e. parallel to the ground) are unsafe for other reasons. For instance, unlevel trailers have an increased tendency to sway and a driver will have less control of the towing vehicle during a stopping or turning maneuver.

None of the prior adjustable hitches allow for infinite unbounded, or unlimited height adjustment within a specified range of adjustment. A need therefore exists for a hitch having this functional capability.

There are several couplers in common use for securely coupling a trailer to a towing vehicle. These couplers are difficult to close and latch. Most require additional and cumbersome means such as the insertion of a pin or keeper, or the twisting of a hand-wheel screw to be used to retain the coupler in the locked position, even after it has been closed. Failure to use such additional and cumbersome means can result in coupler unlatching and/or uncoupling of the trailer from the towing vehicle during transport. Applicant has personal knowledge (of several occasions) and first hand experience with trailers uncoupling from the towing vehicle and leaving the road. Applicant has second-hand knowledge of these run-away trailers striking oncoming vehicles and causing serious injury to its occupants.

Many of the couplers in common use are very difficult to latch and unlatch, even when new. After exposure to the elements, most corrode and are impossible to latch without using a hammer or other striking tool to move them into the closed position and a prying tool to move them into the unlatched position when uncoupling from the trailer.

A major difficulty in closing and aligning other couplers, even when new, is caused by their allowing the possibility of misalignment due to movement of the trailer ball within the coupler of the towing vehicle when the coupler is in the unlatched position. This is because the coupler itself when unlatched "opens-up" or is disconnected creating an opening in the socket which accepts the trailer ball. In this situation a sufficient force is required to move the latching mechanism of the coupling device into its locked position since the mechanism may be bearing some weight of the towing vehicle and a force is required to simultaneously move the trailer sideways or forward so that the trailer ball is centered or aligned in the ball receiver or socket when the coupler is closed.

Although couplers having a stationary plate, a pivot plate, a pivot pin and a latch pin have been in use for 20 years or more in a gooseneck type ball coupler, applicant does not believe the same has been used with a tongue or bumper-pull trailer hitch nor in a combination similar to applicant's. The pivoting plate coupler in use in the gooseneck type ball coupler does not lend itself to use with a tongue or bumper-pull trailer coupler. The present invention includes a pivoting plate coupler in a new combination so as to facilitate several advantages including use with a tongue or bumper-pull hitch.

SUMMARY OF THE INVENTION

The present invention overcomes height adjustment-/resonant vibration problems by allowing for infinite or unlimited height adjustment preferably within a range of six to twelve inches (eight inches of infinite adjustment is allowed in the prototype, standard model ).

The present invention provides additional improvements with the employment of a pivoting plate, hitch coupling mechanism.

The pivoting plate coupler disclosed in the present invention overcomes the convenience and safety problems discussed above. When the pivoting plate on applicant's coupler is pivoted into the closed position, the spring loaded latch pin automatically drops through the hole provided in the pivoting plate, locking the coupler in the closed position. No additional steps or means of securing the coupler in the locked position are necessary. The pivoting plate of the present invention can be moved from the latched position to the unlatched position and vice versa using two (2) fingers. The design of the pivoting plate ensures that it will retain its ease of operation unless it is left exposed to the elements until its parts are virtually fused together by rust.

The coupler of the present invention also overcomes the closing and aligning problem. The socket of the coupler of the present invention does not "open-up" or disconnect when the coupler is unlatched. Thus, when the coupler drops onto the trailer ball of the towing vehicle, it is automatically centered in the position required for closing the coupler. Moreover, no weight rests on the pivoting plate. Therefore, to latch the coupler the pivoting plate can be moved into the closed (and locked) position, by overcoming the negligible friction of the pivot pin only.

BRIEF DESCRIPTION OF THE DRAWINGS

FIG. 1 is a perspective view of the adjustable trailer hitch.

FIG. 2 is a side elevational view of the adjustable trailer hitch.

FIG. 3 is a bottom view of the adjustable trailer hitch shown in the unlocked position.

FIG. 4 is a bottom view of the adjustable trailer hitch shown in the locked position.

FIG. 5 is a sectional view taken along line 5—5 of FIG. 4 including a representation of a towing vehicle trailer ball.

DETAILED DESCRIPTION OF THE INVENTION

Referring to FIGS. 1 and 5, the adjustable trailer hitch 10 generally includes a stationary plate 11 and a sliding plate 12 as the means of adjustment. The stationary plate 11 defines a vertical slot 28. Tongue 13, which includes coupler assembly 60 is attached to sliding plate 12.

More specifically, the adjustable trailer hitch 10 having a pivoting plate coupler is made of the parts and in the manner described below.

A sliding plate 12 having bolt holes 29a and 29b is slidably connected to a stationary plate 11. The connection is made by two adjustment bolts 21a and 21b which are inserted through lock washers 22a and 22b, hence through bolt holes 29a and 29b in sliding plate 12, then through slot 28 in stationary plate 11, thence through holes 50a and 50b in friction plates 24a and 24b and threaded into adjustment nuts 23a and 23b which are attached, as by welding, to friction plates 24a and 24b. A stiffener 25 acts to stiffen and add strength to stationary plate 11, and also acts as a housing to prevent friction plates 24a and 24b from rotating when adjustment bolts 21a and 21b are tightened or loosened. When adjustment bolts 21a and 21b are tightened to a proper torque such as, for example, seventy-five foot pounds, sliding plate 12 is secured against and will not slip along stationary plate 11. When adjustment bolts 21a and 21b are loosened, sliding plate 12 will slide vertically, in relation to the ground, along stationary plate 11 with adjustment bolts 21a and 21b sliding within the upright or vertical slot 28 in stationary plate 11 allowing infinite, unbounded or unlimited height incrementations or adjustment of sliding plate 12 and attached tongue 70 relative to plate 11 within a predefined adjustment range.

The predefined adjustment range is defined by the length of slot 28 in stationary plate 11 and the distance between adjustment bolts 21a and 21b. For example, slot 28 may be about twelve inches long with bolts 21a and 21b spaced about four inches apart allowing about an eight inch predefined adjustment range. Lock washers 22a and 22b prevent adjustment bolts 21a and 21b from vibrating loose once tightened to a proper torque value.

A rod 25a is attached, as by welding, between stiffner 25 and stationary plate 11 to act as a stop preventing adjustment nuts 23a and 23b and friction plates 24a and 24b from falling out the bottom of the stiffner 25.

Referring to FIGS. 1–5 the tongue 70 generally includes a tongue body 13, a coupler plate 15, a pivot plate 16, a latch pin 17, a ball socket 14, a latch pin retainer 43 and a pivot pin 37. Tongue body 13 defines a latch pin hole 31 and includes a top 13a, sides 13b and 13c and a lower side 13d. Coupler plate 15 defines a pivot pin hole 30, a latch pin hole 33, a ball hole 35 and a drain hole 38. Coupler plate 15 includes an upper surface 15a and a lower surface 15d. Latch pin 17, which may have other shapes, includes a distal end 17a, a proximal end 17b and a bend 17c. Pivot plate 16 defines a pivot pin hole 32, a latch pin hole 34 and a ball hole 36. Pivot plate 16 includes an upper surface 16a and a lower surface 16d. Pivot pin 37 includes a head 37a and a tail end 37d. Latch pin retainer 43 defines a latch pin hole 44. Latch or pivot plate handle 20, which may have other shapes, includes a handle end 20aa pivot plate connection end 20b and a bend 20c.

The tongue 70 and coupler assembly 60 are made in the following manner: Latch pin spring retainer 19 is attached, as by welding, to latch pin 17 such that the straight, distal end 17a of latch pin 17 is sufficiently long as to extend through latch pin hole 33 in coupler plate 15, through latch pin hole 34 in pivot plate 16, and through and some ¼ inch beyond hole 44 in latch pin retainer 43, when latch pin spring retainer 19 is in contact with coupler plate 15. Latch pin spring 18 is then slid over the distal end 17a and around the bend 17c in latch pin 17, thence against latch pin spring retainer 19. Latch pin 17 is then inserted through hole 31 in tongue body 13 from the bottom side 13d of tongue body 13 until the bend 17c in latch pin 17 is above tongue body 13. The bottom surface 13d of tongue body 13 then acts as an upper retainer for latch pin spring 19.

Ball socket 14 is a cohesive member which defines a dome-shaped cavity for receiving the trailer ball 80. Ball socket 14 is attached, as by welding, to the upper surface 15a of coupler plate 15 and in alignment with the trailer ball hole 35. 25 Pivot pin 37 is inserted upwards through hole 32 in pivot plate 16, thence through hole 30 in coupler plate 15 until the head 37a of pivot pin 37 is in contact with the lower surface 16d of pivot plate 16. The tail end 37d of pivot pin 37 is then attached, as by welding, to the upper surface 15a of coupler plate 15 to hold it in position. The distance between the top 14a of the ball socket 14 and the bottom 16d of pivot plate 16 should be less than the distance between the top of the trailer ball 80 and the horizontal surface 82 upon which the trailer ball 80 is mounted so that the pivot plate 16 will not contact the horizontal surface 82 during the latching sequence.

Coupler plate 15 is then attached, as by welding, to the lower surface 13d of tongue body 13. Note that when placing tongue body 13 into position upon coupler plate 15 for attachment that latch pin 17 is inserted both through hole 33 in coupler plate 15 and hole 34 in pivot plate 16 such that latch pin 17 is substantially perpendicular to both coupler plate 15 and the top surface 13a of tongue body 13, while top surface 13a and coupler plate 15 are substantially parallel to each other.

The length of latch pin 17 is such that when latch pin 17 is lifted upwards so that latch pin spring 18 is fully compressed between latch pin spring retainer 19 and the lower surface 13d of tongue body 13, the end 17a of latch pin 17 is above pivot plate 16 but still within the hole 33 in coupler plate 15.

Latch pin retainer 43 is attached, as by welding, to the lower surface 15d of coupler plate 15 such that latch pin hole 44 is in alignment with latch pin holes 31, 33 and 34 in tongue body 13, coupler plate 15 and pivot plate 16, respectively, and latch pin retainer 43 via latch pin hole 44 surrounds the end 17a of latch pin 17 when the coupler assembly 60 is in the closed and locked position (FIGS. 4 and 5).

The portion of the tongue 70 and coupler assembly 60 consisting of the rear surfaces 13e and 15e of tongue body 13 and coupler plate 15, respectively, are then attached to sliding plate 12, as by welding, such that the tongue 70 and coupler assembly 60 are perpendicular to and substantially centered on sliding plate 12. Tongue gussets (not shown) may be attached, as by welding, to the rear portion 15e of coupler plate 15 and to sliding plate 12. Cover plate 40 is attached, as by welding, to close the end 13f of the tongue body 13 against the elements (13b, 13c and 40 may be formed from one metal strip bent in a U-shape). Drain hole 38 is provided through coupler plate 15 near its point of connection with sliding plate 12 to allow for drainage of any water which might enter the tongue 70 and coupler assembly 60. The hitch 10 can be constructed so that the latch handle 20 extends from either side 13b or 13c of the tongue body 13.

Mounting plate 27 is attached, as by welding, substantially perpendicular to the rear surfaces of stationary plate 11 and/or stiffener 25, at a vertical position which will allow mounting plate 27 to rest upon the upper surface of a tongue (not shown) of a trailer (not shown) to which mounting plate 27 will be attached during the trailer manufacturing process. The vertical point of attachment should take into consideration the height of the upper surface of the trailer tongue (not shown) in relation to ground level, such that the middle of the unlimited incremental adjustable range of the adjustable trailer hitch 10 will be at the desired height above the ground when the tailer is level (generally about 19 inches).

Gussets 26 are attached, as by welding, to the sides of mounting plate 27, substantially perpendicular to mounting plate 27 and may be integral with and bent or attached, as by welding, to the outer edges in the vertical plane, of stationary plate 11. The inner surfaces of gussets 26 may form an angle to match the angle of the trailer tongue (not shown) upon which the mounting plate 27 will rest when mounted. It is readily apparent from the above statement, that the actual shape of mounting plate 27 and gussets 26 must change somewhat in order to accommodate mounting to trailers with differing tongue angles and heights. There are considerable variations in "industry standards" among various manufacturers. A standard model could mount upon the trailer tongue (not shown) and be welded in place causing the center of adjustment to be three inches above the top of the tongue, or if the tongue forms a fifty degree angle, the hitch 10 can be set over the trailer tongue and welded or bolted in place, with the center of adjustment at the top of the tongue.

A trailer (not shown) equipped with the adjustable tongue or bumper-pull trailer hitch 10 with pivoting plate coupler assembly 70 can be coupled to a towing vehicle ball 80 as described below.

Operate the trailer jack (not shown but which may be attached to the adjustable hitch 10 by the trailer owner or manufacturer) until pivot plate 16 is higher than the trailer ball 80 of the towing vehicle 84. If pivoting plate 16 is in the closed and locked position (FIGS. 4 and 5), open it by lifting latch pin 7 to its maximum travel ($\frac{1}{2}$ to $\frac{3}{4}$ inch). While holding latch pin 17 up, pull latch handle 20 away from tongue body 13 to its maximum travel ($\frac{1}{2}$ to 1 inch), thereby rotating pivot plate 16 so that ball hole 36 in pivot plate 16 is in alignment with ball hole 35 in coupler plate 15. The coupler 60 is now in its full open position as shown in FIG. 3. By releasing latch pin 17, latch pin spring 18 will hold end 17a of latch pin 17 against the upper surface 16a of pivot plate 16 so that it will remain in the open position by frictional engagement during the coupling operation.

The towing vehicle 84 should then be backed into a position such that trailer ball 80 is directly underneath holes 35 and 36 which are in alignment with each other since the coupler 60 is now unlatched. The brake on the towing vehicle 84 should be set so that the trailer ball 80 remains in position.

Operate the trailer jack mounted via jack slot and bolt holes (three shown) 42 so that the coupler assembly 60 is lowered down over the trailer ball 80. All interacting forces at the point of connection between the towing vehicle 84 and trailer are borne at the point of contact between the ball socket 14 and the trailer ball 80. Pivot plate 16 is free to rotate. By pushing the latch handle 20 toward tongue body 13, pivot plate 16 will rotate until latch pin hole 34 comes into alignment with latch pin hole 33 in coupler plate 15. When this alignment is achieved, latch pin 17, which is already in alignment with holes 33 and 34, will automatically be inserted through latch pin hole 34 in pivot plate 16 and latch pin hole 44 in latch pin retainer 43 by virtue of the force exerted by latch pin spring 18, and will extend below latch pin retainer 43, thereby locking the coupler assembly 60 in its closed position (FIGS. 4 and 5) which also prevents pivot plate 16 from rotating such that ball hole 36 in pivot plate 16 could become aligned with ball hole 35 in coupler plate 15. In other words, when in the closed position, ball hole 36 in pivot plate 16 is NOT in alignment with ball hole 35 in coupler plate 15. This misalignment prevents the trailer ball 80 from coming out of the coupler, thereby uncoupling the trailer from the towing vehicle 84.

The trailer can now be leveled by employing the adjustable feature of the present invention in the manner described below.

Loosen both adjustment bolts 21a and 21b so that they will slide within slot 28 in stationary plate 11. Operate the trailer jack until the trailer is level. Tighten adjustment bolts 21a and 21b to specified torque values, thereby securing sliding plate 12 and the attached coupler assembly 60 in its newly adjusted height position against stationary plate 11.

Operate the trailer jack so that its lower end is well above the ground. Connect required electrical connections, safety chains, etc. as is common practice. The trailer is now properly coupled to the towing vehicle 84 and leveled for transport.

All fabricated parts are preferably made from construction grade steel having a thickness suitable to provide strength sufficient to withstand forces generated under loads required for the specified class of hitch being manufactured plus industry standard safety factors.

For example, a Class 3 hitch specifies that the hitch be rated for use with a trailer having a gross vehicle weight rating (GVWR) of 5000 pounds and that the hitch be rated for a vertical load of 500 pounds (industry standard is ten percent weight transfer to a coupler). On this hitch, the adjustment plate 12 could be made from steel in the range of $\frac{3}{8}$ to 7/16 inch thickness. The tongue 13 in the range of $\frac{1}{8}$ to 3/16 thickness, and the adjustment bolts 21 in the range of $\frac{1}{2}$ to $\frac{5}{8}$ inch diameter.

A Class 4 hitch specifies that the hitch be rated for use with a trailer having a gross vehicle weight rating (GVWR) of 12,500 pounds and that the hitch be rated for a vertical load of 1,250 pounds. On this hitch, the adjustment plate 12 could be made from steel in the range of ⅛ to ¾ inch thickness, the tongue 13 in the range of ¼ to 5/16 thickness, and the adjustment bolts 21 in the range of ¾ to 1 inch diameter.

Steel thickness and, therefore, total hitch weight, may be reduced by using higher carbon steel with greater strength yield characteristics.

The invention may be made employing both the unlimited incremental adjustment range and the pivot/coupler plate features or one of these two features may be individually employed in a adjustable trailer hitch 10.

The preferred embodiment of the invention has been shown and described. Minor changes can be made in the design and construction of the invention without departing from the spirit of the invention as claimed.

What is claimed is:

1. An adjustable trailer hitch for hitching a trailer to a vehicle, comprising:
 a first member attached to the trailer;
 second member attached to a means for coupling the trailer to the vehicle; and
 a means for unlimited vertical adjustment within a predefined range for securing and setting a position between the first member and the second member wherein said means for unlimited vertical adjustment within a predefined range comprises:
 the first member having an upright slot;
 the second member having two vertically aligned bolt holes spaced apart by a distance less than the length of the upright slot;
 a locking member having two bolt holes;
 the first member being placed between the second member and the locking member; and
 two bolts inserted through the bolt holes in the second member and the locking member and through the upright slot in the first member whereby the bolts can be secured to set the position of the first member relative to the second member and the bolts can be loosened to adjust the first member relative to the second member within the predefined range determined by the length of the upright slot and the distance between the bolt holes in the second member.

2. The adjustable trailer hitch according to claim 1, further including two lock washers interposed between the bolts and the second member.

3. The adjustable trailer hitch according to claim 1 wherein the first member is a plate and the second member is a plate.

4. An adjustable trailer hitch for hitching a trailer to a vehicle, the vehicle having a trailer ball attached to a horizontal surface, comprising:
 a tongue body connected to a trailer mounting member, said tongue body defining a latch pin hole;
 a coupler plate attached to the tongue body, the coupler plate defining a ball opening and a latch pin hole;
 a ball socket attached to the coupler plate over the ball opening;
 a pivot plate pinned to said coupler plate with a pivot pin, the pivot plate defining a ball opening and a latch pin hole wherein the combined depth of the ball socket and the ball openings in the coupler plate and the pivot plate is less than the distance the trailer ball extends from the horizontal surface;
 a latch pin inserted through the latch pin holes in the tongue body and the coupler plate and insertable through the latch pin hole in the pivot plate;
 a means for biasing the latch pin through the latch pin hole in the pivot plate when the ball opening in the pivot plate is not aligned with the ball opening in the coupler plate; and
 a means for rotating the pivot plate relative to the coupler plate when the latch pin is removed against the biasing means from one of the latch pin holes.

5. The adjustable trailer hitch according to claim 4 wherein the tongue body further includes a means for protecting the latch pin and the biasing means from environmental elements.

6. The adjustable trailer hitch according to claim 4, further comprising a latch pin retainer attached to the coupler plate, the latch pin retainer defining a latch pin hole for retaining the latch pin when the ball opening in the coupling plate and the ball opening in the pivot plate are not aligned.

7. The adjustable trailer hitch according to claim 4 wherein the biasing means comprises a retainer connected to the latch pin, and a spring placed over the latch pin and biased between the retainer and the tongue body.

8. The adjustable trailer hitch according to claim 4, wherein the ball socket comprises a cohesive member defining a dome shaped cavity.

9. The adjustable trailer hitch according to claim 4, wherein the adjustable trailer hitch includes a means for draining.

10. An adjustable trailer hitch for hitching a trailer to a vehicle, the vehicle having a trailer ball attached to a horizontal surface, comprising:
 a tongue body secured and set relative to a trailer mounting member, said tongue body defining a latch pin hole;
 a means for unlimited vertical adjustment within a predefined range for securing and setting a position between the tongue body and the trailer;
 a coupler plate attached to the tongue body, the coupler plate defining a ball opening and a latch pin hole;
 a ball socket comprising a cohesive member defining a dome shaped cavity attached to the coupler plate over the ball opening;
 a pivot plate pinned to said coupler plate with a pivot pin, the pivot plate defining a ball opening and a latch pin hole wherein the combined depth of the ball socket and the ball openings in the coupler plate and the pivot plate is less than the distance the trailer ball extends from the horizontal surface;
 a latch pin inserted through the latch pin holes in the tongue body and the coupler plate and insertable through the latch pin hole in the pivot plate;
 a means for biasing the latch pin through the latch pin hole in the pivot plate when the ball opening in the pivot plate is not aligned with the ball opening in the coupler plate; and
 a means for rotating the pivot plate relative to the coupler plate when the latch pin is removed against the biasing means from one of the latch pin holes.

11. The adjustable trailer hitch according to claim 10 wherein said means for unlimited vertical adjustment within a predefined range comprises:
 a first plate attached to the trailer, the first plate having an upright slot;

a second plate attached to the tongue body, the second plate having two vertically aligned bolt holes spaced apart by a distance less than the length of the upright slot;

a locking member having two bolt holes;

the first plate being placed between the second plate and the locking member; and two bolts inserted through the bolt holes in the second plate and the locking member and through the upright slot in the first plate whereby the bolts can be secured to set the position of the first plate relative to the second plate and the bolts can be loosened to adjust the first plate relative to the second plate within the predefined range determined by the length of the upright slot and the distance between the bolt holes in the second plate.

* * * * *